Figure 1:
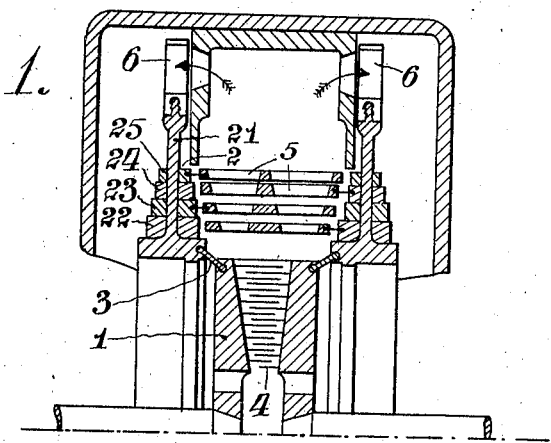

O. A. WIBERG AND S. M. BÄCKSTRÖM.
FLUID PRESSURE TURBINE.
APPLICATION FILED MAY 9, 1917.

1,318,307.

Patented Oct. 7, 1919.

Inventors:
Oscar Anton Wiberg,
Sigurd Mattias Bäckström
By [signature]
Atty.

UNITED STATES PATENT OFFICE.

OSCAR ANTON WIBERG AND SIGURD MATTIAS BÄCKSTRÖM, OF FINSPONG, SWEDEN, ASSIGNORS, BY MESNE ASSIGNMENTS, TO AKTIEBOLAGET LJUNGSTROMS ANG-TURBIN, OF STOCKHOLM, SWEDEN, A CORPORATION.

FLUID-PRESSURE TURBINE.

1,318,307. Specification of Letters Patent. Patented Oct. 7, 1919.

Application filed May 9, 1917. Serial No. 167,587.

*To all whom it may concern:*

Be it known that we, OSCAR ANTON WIBERG and SIGURD MATTIAS BÄCKSTRÖM, subjects of the King of Sweden, (whose post-office addresses are Finspong, Sweden,) have invented new and useful Improvements in Fluid-Pressure Turbines, of which the following is a specification.

This invention relates to fluid pressure turbines, for instance steam and gas turbines, for large amounts of power, and more especially to the disks of such turbines, carrying the blade or vane rings.

One application of our invention is in connection with the disks of radial flow or combined radial and axial flow turbines and in the following specification it is specifically described in this connection. It will be understood, however, that the invention is not necessarily limited thereto.

The disks of radial flow or combined radial and axial flow turbines carrying the blade rings are generally divided into concentric sections connected by means of expansion rings. The object of such division is to prevent the stresses and deformations, which would occur in a solid disk exposed to the varying and unequally distributed temperatures existing during the running of the turbine at different distances from the inlet. Besides, said division also facilitates, to a certain extent, the manufacture and hardening of the turbine disks. Such a division has, however, been found not to be sufficient in the turbine disks of very large turbines, since the sections of the disk will be so large that it is very difficult to heat and harden said sections in such manner that the material of the core of the section obtains the required strength.

The object of the present invention is to provide an improved disk or disk structure wherein the above referred to difficulty is prevented or overcome and for a consideration of what we believe to be novel and our invention, attention is directed to the following specification and the claims appended thereto.

In carrying out our invention we construct a turbine disk or, in case the disk is formed in two or more disk sections, one or more of such disk sections of a plurality of separate concentric annular rings rigidly fitted to each other. Preferably a disk or disk section constructed according to our invention comprises an inner ring which forms a hub of the disk or disk section and which has formed integral therewith a core or web and a plurality of concentric rings which surround the hub on each side of the core and serve to strengthen the core. These rings may be rigidly connected by shrinking or in other suitable manner. By this means the cores and the rings will be of comparatively small cross section so that they may be heated and hardened in a manner most fit for turbine disks. At the same time the completed disk or disk section will have the necessary size and strength to withstand the stresses to which it may be subjected.

An illustrative embodiment of our invention applied to turbine disks of radial steam turbines is by way of example, represented in the accompanying drawing in which—

Figure 2:
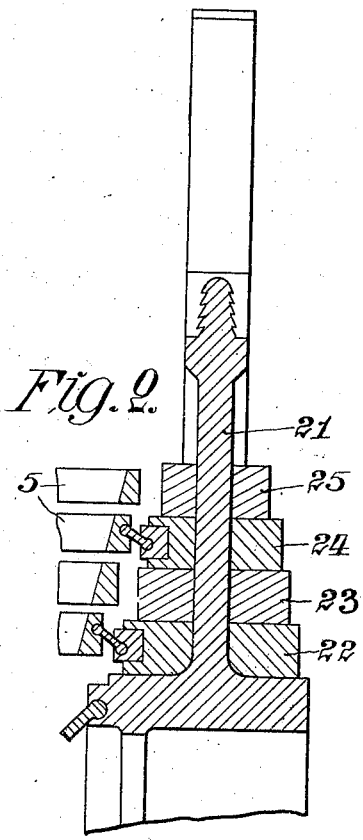

Figure 1 shows in a substantially diagrammatic manner a partial section of a radial turbine having double blade systems rotating in opposite directions, the outer disk sections carrying axial blades and being constructed in accordance with the invention. Fig. 2 is a cross-section on a larger scale of the outer disk section shown in Fig. 1.

Referring to Figs. 1 and 2, each of the turbine disks supporting the blade rings is in a well-known manner composed of sections 1 and 2 interconnected by means of expansion rings 3. The sections 1 and 2 support, as usual, series of radial flow blade rings 4 and 5 respectively and, besides, each of the sections 2 is provided with a ring of axial flow blades 6. Owing thereto the outer sections 2 will be exposed to heavy stresses, and in order to give the said sections a sufficient strength they are, according to the invention, further divided concentrically, said sections being composed of a core member 21 and strengthening rings 22, 23, 24 and 25 shrunk on said core member or connected therewith in any other suitable manner. By this division a too large cross-section of the disk section 2 is prevented, which would render the heating and hardening of said section difficult. In the embodiment shown in Fig. 2 the core-member 21 is T-shaped, and the strengthening rings 22 to 25 inclusive are placed at each side of the web of the core member. This form may, however, be varied according to the circumstances.

The invention may also be applied to turbine disks carrying only axial blades.

Having now particularly described and ascertained the nature of our said invention and in what manner the same is to be performed, we declare that what we claim is:

1. In a fluid pressure turbine, a blade carrying member comprising a core and a plurality of strengthening rings located on each side of the core.

2. In a fluid pressure turbine, a blade carrying member comprising a plurality of concentric sections and expansion ring means connecting said sections together, at least one of said sections comprising a plurality of concentric annular rings rigidly fitted to each other.

3. In an elastic fluid turbine, a blade carrying member comprising an inner ring forming a hub, a web member integral therewith, and annular rings which surround said hub on each side of the web member.

4. In a fluid pressure turbine, a blade carrying member comprising a core and a number of strengthening rings connected with said core.

5. In a fluid pressure turbine, a blade carrying member divided into sections, some of said sections consisting of a core and a number of strengthening rings connected to said core.

In testimony whereof we have signed our names.

OSCAR ANTON WIBERG.
SIGURD MATTIAS BÄCKSTRÖM.